A. SODERLUND.
EXPANSION TOOL.
APPLICATION FILED JUNE 4, 1909.
964,704.
Patented July 19, 1910.
2 SHEETS—SHEET 1.
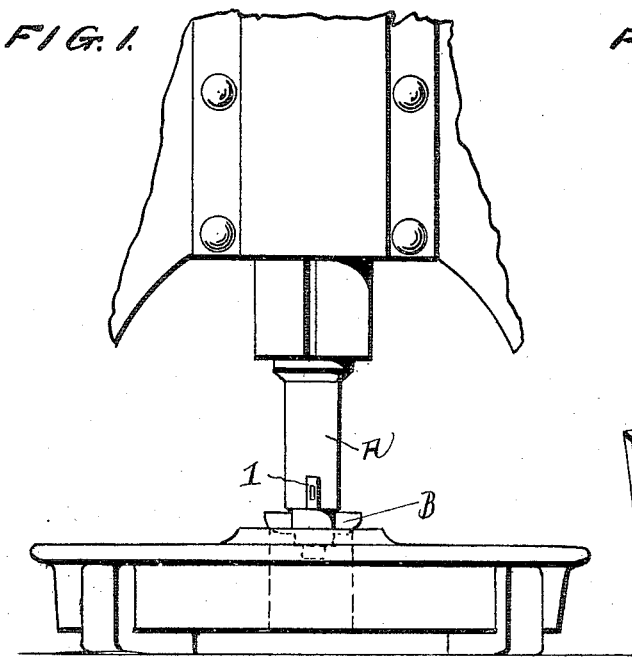
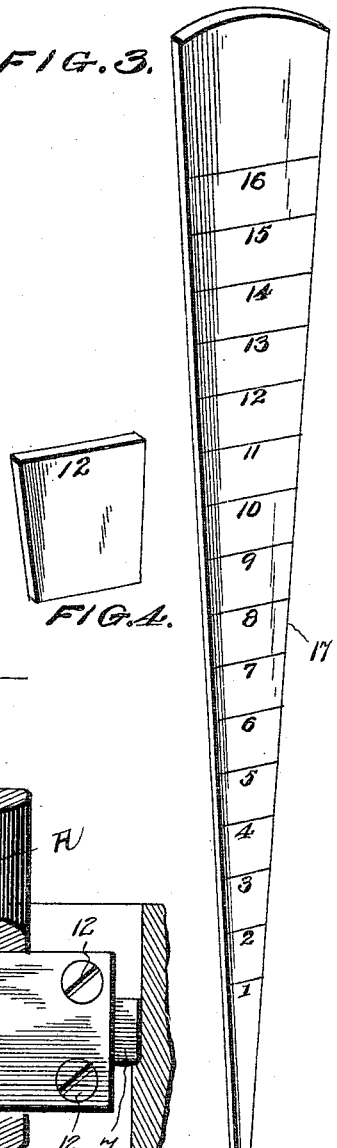
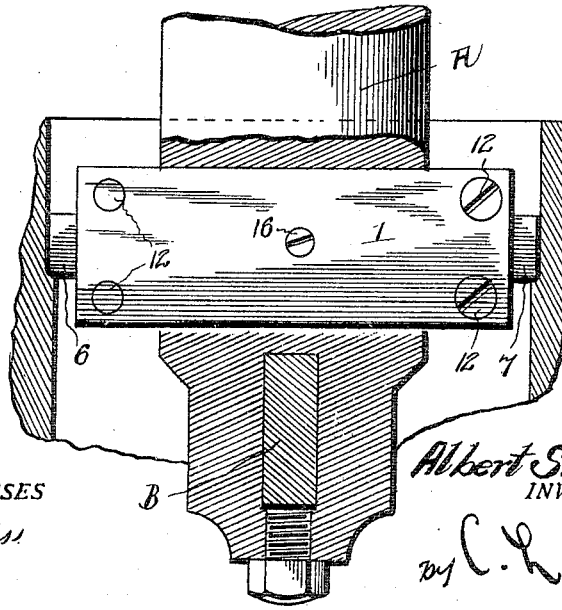
WITNESSES
Chas. K. Daviss
Myron G. Clear
Albert Soderlund
INVENTOR
by C. L. Parker
Attorney

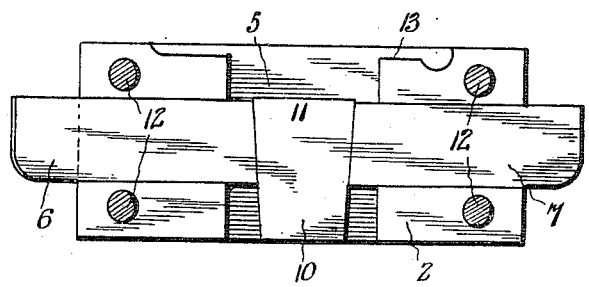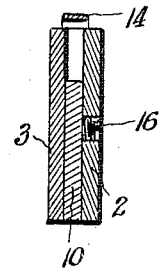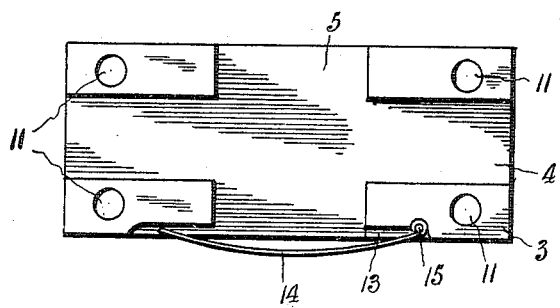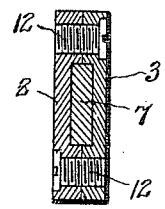

UNITED STATES PATENT OFFICE.

ALBERT SODERLUND, OF FITZGERALD, GEORGIA.

EXPANSION-TOOL.

964,704.

Specification of Letters Patent. Patented July 19, 1910.

Application filed June 4, 1909. Serial No. 500,190.

*To all whom it may concern:*

Be it known that I, ALBERT SODERLUND, a citizen of the United States, residing at Fitzgerald, in the county of Irwin and State of Georgia, have invented certain new and useful Improvements in Expansion-Tools, of which the following is a specification.

My invention relates to expansion tools, and more particularly to an expansion tool for use in connection with boring bars, embodying a holder, and tools of novel structure and a gage bar and wedge piece corresponding to the divisions of the gage bar for insertion between the inner ends of the tools to obtain the desired expansion.

In the accompanying drawings, which illustrate my invention and form a part of this specification, Figure 1 is a view in elevation illustrating the practical application of my invention. Fig. 2 is a fragmentary sectional view through a portion of Fig. 1. Fig. 3 is a perspective elevation of the gage bar. Fig. 4 is a similar view of one of the wedge pieces. Fig. 5 is an inner face view of one of the clamping plates of the holder, illustrating the tools and a wedge piece therein. Fig. 6 is a similar view of the opposite clamping plate. Fig. 7 is a central transverse sectional view through the holder. Fig. 8 is a transverse sectional view through the holder adjacent one end thereof. Fig. 9 is a face view of one of the tools removed, and, Fig. 10 is an edge view thereof.

In the practical embodiment of my invention, I provide a holder carrying tools, and adapted for insertion through an opening formed transversely through a boring bar A, at right angles to and above its usual opening for the reception of the single piece cutting tool B. In using my invention, in connection with a boring bar for boring out the journal openings of car wheels, as shown in Fig. 1, the usual tool B is employed to make the rough initial cut, while the tools of my improved holder are set to make the finishing cut, and to bore out the opening to the exact size desired.

The holder 1, comprises opposing clamping plates 2 and 3 shown in Figs. 5 and 6 respectively, which plates are provided with coöperating longitudinal and transverse slots 4 and 5, in their inner faces, which intersect one another. The tools 6 and 7, each of which has outer beveled sharpened ends 8, and inner angular ends 9, are slidably disposed within the longitudinal slots 4 whereby a wedge piece 10 (Fig. 5) inserted within the transverse slots 5, may be located between their inner ends. Alined openings 11, are formed through the clamping plates 2 and 3 at the sides of their aforementioned slots, there being four of such openings in all, as shown, the openings upon the plate 2 being threaded to engage the screws 12 extending through the openings upon said plate 3 to clamp the plates together and securely maintain the tools 6 and 7 in position. Screws 12 may be screwed inwardly from opposite sides of the holder to rigidly clamp the plates thereof as shown in Fig. 8. The clamping plates 2 and 3 are further provided with slots 13, in their inner faces along one of the longitudinal edges thereof, within which is mounted a flat spring 14 having one end thereof bent about a pin 15 of the plate 3 located at one end of slots 13. Thus, when the holder is inserted through the boring bar opening as shown in Fig. 2, the frictional engagement of spring 14 against the adjacent wall of the opening maintains the holder in position. A set screw 16, is tapped centrally through the clamping plate 2, and is adapted to be screwed into engagement with the wedge piece 10 to rigidly hold the latter in position.

A longitudinally tapering gage bar 17 is provided with a plurality of longitudinal divisions, each one of which divisions is numbered, and the gage bar is adapted for insertion through the transverse slots 5 of the clamping plates in order to expand the tools 6 and 7, to obtain the required distance from end to end thereof, corresponding to the desired diameter of the finished bore to be cut. A plurality of wedge pieces are provided corresponding to a mark in accordance with the divisions of the gage bar 17, whereby when the required distance from end to end of the tools is determined, by the said gage bar, the latter may be removed and the corresponding wedge piece inserted and clamped between the ends of the tools 6 and 7 by means of the set screw 16. One of these wedge pieces "Number 11" is shown at 10 in Fig. 5, and has been before described, while another wedge piece "Number 12" is shown in Fig. 4.

In practical use, tools 6 and 7 may be of unequal length whereby it will project a slightly greater distance beyond the corresponding end of the holder and follow the other tool for the purpose of making a shallow finishing cut.

Having fully described my invention, I claim:

A device of the character described, comprising a body portion formed of two separate relatively removable opposing plates, a longitudinal slot arranged upon each of said plates in alinement with each other, a transverse slot arranged upon each of said plates in alinement with each other and merging into said first named slots, tools provided with beveled inner ends arranged within said first named slots, a wedge arranged within said second named slots for engagement with the said beveled ends of said tools, said wedge being adapted to remain between said tools during the cutting of a bore of a certain size, serving as a lock for preventing the tools from moving inward, and means for holding said wedge in place.

In testimony whereof I affix my signature in presence of two witnesses.

ALBERT SODERLUND.

Witnesses:
E. E. ROACH,
G. W. HARRINGTON.